Oct. 14, 1930.  I. C. JENNINGS  1,778,258
JOURNAL BOX
Original Filed July 9, 1923
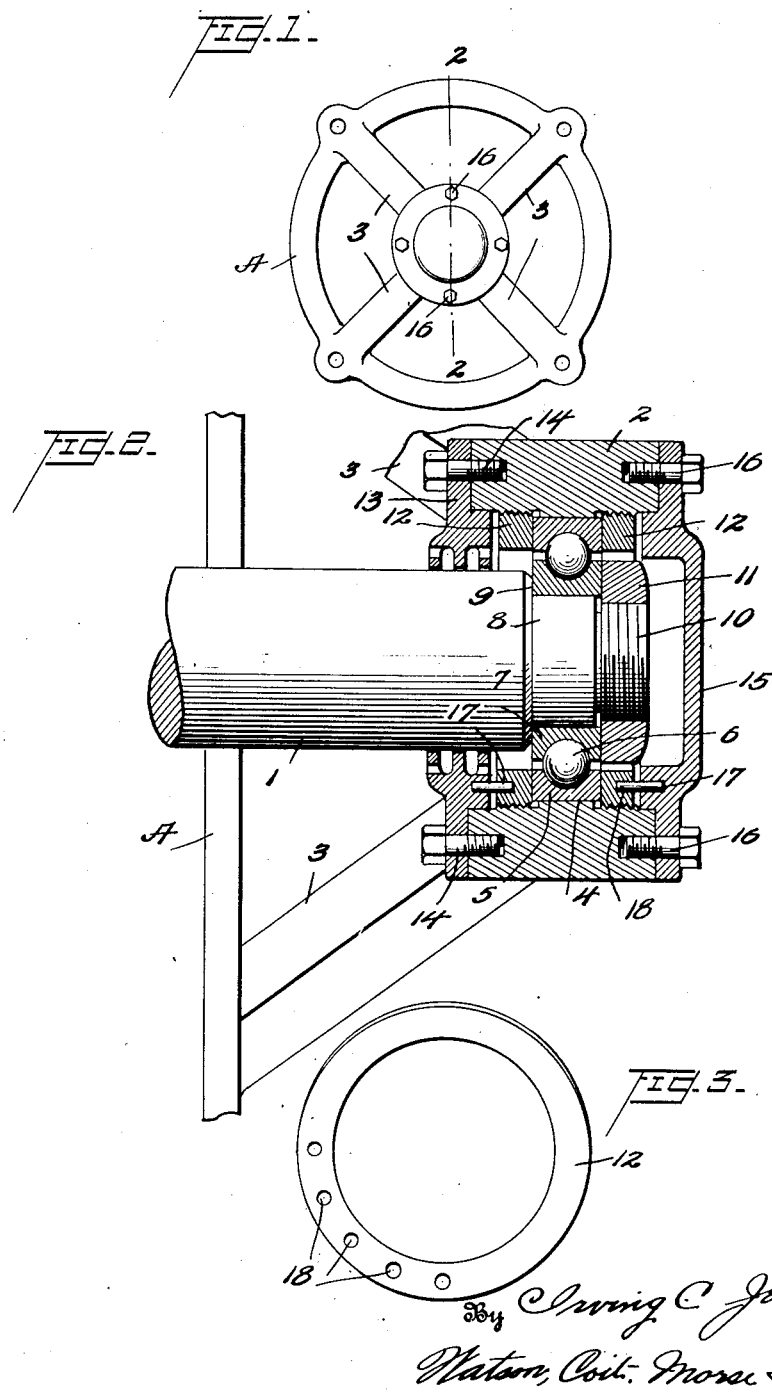
Inventor
By Irving C. Jennings,
Watson, Coit, Morse & Grindle,
Attorney Patented Oct. 14, 1930

1,778,258

UNITED STATES PATENT OFFICE

IRVING C. JENNINGS, OF SOUTH NORWALK, CONNECTICUT, ASSIGNOR TO NASH ENGINEERING COMPANY, OF SOUTH NORWALK, CONNECTICUT, A CORPORATION OF CONNECTICUT

JOURNAL BOX

Original application filed July 9, 1923, Serial No. 650,519, and in Canada May 19, 1924. Divided and this application filed May 3, 1926. Serial No. 106,498.

This invention relates to journal boxes of the type shown and described in my copending application Serial No. 650,519, filed July 9, 1923 for Centrifugal pumps, of which this application is a division. This invention is also shown and described, but not claimed in my Patent No. 1,567,148 issued December 29, 1925 for Pumping apparatus, which was copending with the above mentioned application. While the present invention is adapted for use with the pumps disclosed in said application and patent it is not limited in its use to such structure, but is of general application where it is desired to provide a longitudinal adjustment of the journalled shaft.

One of the principal features of this invention is the provision of an improved means for adjusting the journaled shaft axially so that the elements carried by the shaft may be accurately and delicately adjusted in a longitudinal direction.

Another feature of the invention resides in the provision of an improved means for locking the adjustable bearing in its adjusted position.

Another feature resides in the provision of an adjustable bearing in which the shaft can be adjusted by merely turning the cover plate of the journal box.

Another feature resides in the provision of an adjustable bearing which is readily accessible for adjustment and in which the adjusting and locking means are efficient in operation and simple and inexpensive in manufacture.

Other objects and features of novelty will be apparent from the description taken in connection with the drawings which form a part of this specification and in which:

Figure 1 is an end elevation of a housing forming part of the machine in which the journal is installed, the housing forming a support for the journal, and showing the detachable cap plate;

Figure 2 is a vertical cross-sectional view along line 2—2 of Fig. 1, showing the detailed construction of the adjustable journal; and Figure 3 is a side view of one of the ring nuts in said adjustable journal.

In many types of machinery employing a rotating element carried by a shaft it is desired to provide an axial adjustment of the rotating element. This is especially the case with centrifugal water pumps in which the impeller requires adjustment with respect to the casing. Also when a delicate adjustment is obtained, it is very desirable to securely lock the parts in place to prevent the parts from loosening during operation and thus avoid the necessity of frequent repetition of the adjusting operation. My invention is intended to provide a very effective means of effecting this adjustment by delicately adjusting the shaft in an axial direction and securely locking the elements in the desired position of adjustment.

In carrying out my invention I have provided a shaft having a ball bearing slidably mounted in a bearing support, and adjustable ring nuts threaded in the bearing support and abutting either side of the ball bearing. The rings are provided with holes which are engaged by pins carried by cap plates at either end of the bearing support so as to permit the rings to be turned and thereby adjust the bearing.

Referring more particularly to the drawings, A represents the end portion of a machine in which the shaft carries rotating elements which are desired to be adjusted longitudinally. A housing 2 is carried by the casing of the machine, as by brackets 3, but any other supporting means may be used. The housing 2 has a cylindrical opening which provides an annular shoulder 4 therein which slidably carries the outer raceway 5 for ball bearings 6. The inner raceway 7 is mounted on the reduced end 8 of shaft 1 and bears against shoulder 9. The end 10 of the shaft is further reduced and threaded to receive nut 11 which secures the inner raceway in place by holding it against shoulder 9.

The cylindrical opening in housing 2 is increased on either side of shoulder 4 and threaded to receive ring nuts 12 which bear against the sides of the outer raceway and hold it in position on the shoulder 4. A cap plate 13 centrally bored to receive the shaft is secured to the housing by cap screws 14, and a cap plate 15 is secured to the other end of the housing by cap screws 16.

The cap plate 13 carries a projecting pin 17 entering one of the holes 18 in the adjustable ring nut to hold it in adjusted position or to turn it to an adjusted position, and a similar pin is carried by the cap plate 15 for entering the holes 18 of the outer ring nut. The cap plates when unbolted may be used to turn and adjust the ring nuts, and when secured in position will hold the ring nuts in their adjusted position.

The improved construction of this bearing is such that a very delicate axial adjustment of the element carried by the shaft is obtained. For this purpose the cap screws 14 and 16 are removed and the cap plates 13 and 15 are turned, carrying with them by means of the pin 17 the ring nuts 12. The movement of the nuts 12 causes axial movement of the outer raceway on shoulder 4 which is transmitted through ball bearing 6 and inner raceway 7 to the shaft 1, thus causing an axial adjustment of the rotating element carried by the shaft with respect to the housing 2.

If, as shown, there are four cap screws for each cap plate, the rings can be turned any multiple of a quarter turn. If a finer adjustment is desired, the pins 17 are inserted in different holes 18 after the rings have been partly adjusted. When the adjustment has been made and the cap plates secured in position, the pins hold the ring nuts securely in the adjusted position.

Although one specific embodiment of the invention has been shown for the purposes of illustration, it is to be understood that it is not limited to that particular form beyond what is indicated in the following claims.

Having thus described the invention, what is claimed as new and desired to be secured by Letters Patent is:

1. In a journal box, a shaft, a bearing support, a bearing for said shaft slidably mounted in said support so as to take end thrust in either direction, means for adjusting said bearing and said shaft axially with respect to said support, an external cover plate detachably bolted to said support, and separate means operated by turning said cover plate to actuate said adjusting means.

2. In a journal box, a shaft, a bearing support having a cylindrical opening therein, an annular shoulder in said opening slidably carrying an outer raceway, the end portions of said opening being threaded to receive ring nuts abutting the opposite ends of said outer raceway, an inner raceway carried by said shaft, a series of balls carried between said raceways so as to take end thrust in either direction, said ring nuts being provided with a series of holes, a cover plate detachably secured to said support, and means carried by said cover plate engaging said holes for adjusting said ring nuts, whereby the outer raceway and the shaft, through the action of the balls and the inner raceway, are moved axially with respect to said support.

3. In a journal box, a shaft, a bearing support having a cylindrical opening therein, an annular shoulder in said opening slidably carrying an outer raceway, the end portions being threaded to receive ring nuts abutting the opposite ends of said outer raceway, an inner raceway carried by said shaft, a series of balls carried between said raceways so as to take end thrust in either direction, said ring nuts being provided with a series of holes, cover plates secured to said support and pins carried by said cover plates and engaging said holes for holding said ring nuts against turning.

4. In a journal box, a shaft, a fixed bearing support, a bearing for said shaft slidably mounted in said support, means for adjusting said shaft axially with respect to said support, an external cover plate adapted to be bolted to said support in a plurality of positions, means operated by turning said cover plate to these positions to actuate said adjusting means, and means whereby the cover plate may operate the adjusting means to intermediate positions of adjustment.

5. In a journal box, a shaft, a bearing support having a cylindrical opening therein, an annular shoulder in said opening slidably carrying an outer raceway, the end portions being threaded to receive ring nuts abutting the opposite ends of said outer raceway, an inner raceway carried by said shaft, a series of balls carried between said raceways so as to take end thrust in either direction, said ring nuts being provided with a series of holes, cover plates adapted to be detachably secured to said support in a plurality of positions, pins carried by said cover plates engaging said holes, whereby the rings may be turned with the plates to these positions, and to intermediate positions, effecting an axial adjustment of said shaft with respect to said support.

6. In a journal box, a shaft, a bearing support having a cylindrical opening therein, an annular shoulder in said opening slidably carrying an outer raceway, the end portions of said opening being threaded to receive ring nuts abutting the opposite ends of said outer raceway, an inner raceway carried by said shaft, a series of balls carried between said raceways so as to take end thrust in either direction, an external cover plate adapted to be detachably bolted to said support in a plurality of positions, means carried by said cover plate engaging said ring nuts whereby the shaft is adjusted as the cover plate is moved to these positions.

7. In a journal box, a shaft, a bearing support, a bearing for said shaft slidably mounted in said support for adjustment with respect thereto, a plate adapted to be secured to said support in any one of a plurality of angularly spaced rotative positions, means carried by the cover plate for locking said bearing in any of these positions, said locking means being shiftable to lock said bearing in an intermediate position of adjustment.

8. In a journal box, a shaft, a bearing support, a bearing for said shaft adjustably mounted in said support, a ring member adapted to be turned to effect the adjustment, a plate adapted to be detachably secured to said support in any one of a plurality of angularly spaced rotative positions, means carried by said plate adapted to engage one portion of said ring member to lock it in any of said positions, and said means being adapted to engage another portion of said ring member to lock it in an intermediate position of adjustment.

9. In a journal box, a shaft, a bearing support, a bearing for said shaft slidably mounted in said support for axial adjustment with respect to said shaft, a ring nut for effecting the adjustment, a plate adapted to be selectively secured to said support in a plurality of angularly spaced positions, and means positively connecting said plate and ring nut whereby the plate may lock the ring nut in these positions, the ring nut being provided with a plurality of spaced engaging devices for said connecting means, whereby it may be locked by said cover plate in intermediate positions.

10. In a journal box, a shaft, a bearing support, a bearing for said shaft slidably mounted in said support for axial adjustment with respect to said shaft, a ring nut for effecting said adjustment, provided with a series of holes, a cover plate adapted to be selectively secured to said support in a plurality of predetermined angularly spaced positions, means carried by said cover plate engaging said ring nut by insertion within one of said holes for locking the ring nut in these positions, said means being adapted to engage within another of said holes to lock the ring nut in an intermediate position.

11. In a journal box, a shaft, a bearing support, a bearing for said shaft slidably mounted in said support for axial adjustment with respect to said shaft, a ring nut for effecting the adjustment, a cover plate adapted to be selectively secured to said support in any one of a plurality of predetermined rotatively displaced positions, and means for connecting said cover plate and ring nut whereby the ring nut may be turned by the cover plate to these positions, the ring nut being provided with a plurality of engaging devices for said connecting means, whereby it may be turned by said cover plate to intermediate positions.

12. In a journal box, a shaft, a bearing support, a bearing for said shaft slidably mounted in said support for axial adjustment with respect to said shaft, a ring nut for effecting said adjustment, provided with a series of holes, a cover plate adapted to be secured to said support in any one of a plurality of angularly spaced positions, means carried by said cover plate engaging said ring nut by insertion within one of said holes whereby the ring nut may be turned thereby to these positions, said means being adapted to engage within another of said holes to turn the ring nut to an intermediate position.

13. In combination with a support, a member movable with respect to said support, a cover plate adapted to be secured to said support in any one of a plurality of angularly spaced positions, means for connecting said plate to said member to cause said member to move with said cover plate to said positions, said member being provided with a plurality of selective engaging devices for said connecting means, whereby said member may be moved by said cover to intermediate positions.

14. In combination with a housing containing an adjusting member, a cover plate adapted to be secured to said housing in any one of a plurality of angularly spaced positions, means connecting said cover to said member for movement therewith, said member being provided with means whereby said connecting means may operate for positions intermediate the positions of said cover.

In testimony whereof I hereunto affix my signature.

IRVING C. JENNINGS.